United States Patent [19]
Gorgie et al.

[11] 3,716,832
[45] Feb. 13, 1973

[54] BRAKE LINING CONDITION INDITOR SYSTEM
[76] Inventors: Frank J. Gorgie, 9812 La Cresta Circle, Huntington Beach, Calif. 92627; Gene A. Johnson, 2244 East Franzen, Santa Ana, Calif. 92705
[22] Filed: April 5, 1971
[21] Appl. No.: 131,181

[52] U.S. Cl. ............................. 340/52 A, 200/61.4
[51] Int. Cl. ............................................. B60t 17/22
[58] Field of Search.......... 340/52 R, 52 A; 200/61.4, 61.41, 200/61.44

[56] References Cited

UNITED STATES PATENTS

| | | |
|---|---|---|
| 2,814,684 | 11/1957 | De Pascale .......................... 340/52 A |
| 2,981,929 | 4/1961 | Rizzo et al. .......................... 340/52 A |
| 3,398,246 | 8/1968 | Linet .......................... 340/52 A X |

Primary Examiner—Alvin H. Waring
Attorney—William A. Kemmel, Jr.

[57] ABSTRACT

A brake lining condition indicator system having an electrical contact formed of an insulating sleeve attached to the brake lining support and containing a conducting rod extending into the underside of the brake lining and having an electrical display device and power source connected to such contact so that when the brake lining wears down and the braking surface contacts such rods the display device is activated.

1 Claim, 3 Drawing Figures

PATENTED FEB 13 1973

3,716,832

Frank J. Gorgie,
Gene A. Johnson,
INVENTORS.
BY.

William A. Femmel Jr.
ATTORNEY.

3,716,832

BRAKE LINING CONDITION INDITOR SYSTEM

BACKGROUND OF THE INVENTION

It is well recognized by most vehicle owners or operators that proper maintenance of the brake system including particularly insuring that the brake lining does not become too worn is an important part of proper care of the automobile. For example, if the automobile is operated with worn out brake linings, at the very least when such condition is discovered substantial repair costs are encountered. More important, such situation can cause a brake failure which could result in serious accident causing personal injury or substantial damage. Consequently, most vehicle owners and operators are aware that their braking system maintenance includes periodic replacement of the brake linings but to date there has been no adequate system available to determine when such relining should be carried out. The usual approach to such problem is to have the brake linings replaced or at least checked at arbitrarily selected mileage intervals during the vehicle operation. However, such approach to the problem is clearly unsatisfactory since the amount of wear on the brake lining is dependent on many variables such as the weight and construction of the vehicle, the operating conditions to which the vehicle is subjected and the driving habits of the vehicle operator. Consequently, the condition of the brakelinings tends to be checked at irregular intervals or not at all and solutions such as that suggested by Vinton U.S. Pat. No. 2,253,827 for periodic warnings have not been accepted.

Because of the importance of determining when brakes should be relined and the lack of satisfactory system for making such determination, a substantial number of systems have been proposed to make such determination; however, none of such systems have found significant acceptance to date. One reason for such lack of acceptance is that systems proposed to date have not been sufficiently reliable in that they sense only indirectly the extent of wear on the brake lining and thus are frequently affected by other factors. Also, such systems proposed to date have been relatively expensive, difficult to install and burdensome to maintain. For example, they usually cannot be easily installed on used vehicles.

Consequently, an object of the present invention is an inexpensive brake lining condition indicator system adapted to be easily installed in either used or new vehicles or other equipment having a brake system.

Another object of the present invention is a brake lining condition indicator system which senses directly the wear of the brake lining below a selected thickness.

Still another object of the present invention is a brake lining condition indicator system adapted to use the normal power supply of a vehicle to provide a visual indication when the brake lining becomes too worn each time the brake system is used so that there is a constant reminder that brake relining is required.

Other objects and advantages of the present invention will be readily apparent from the following description and drawings which illustrate a preferred exemplary embodiment of the present invention.

SUMMARY OF THE INVENTION

In general, the present invention involves a brake lining condition indicator system comprising electrical contact means adapted to be attached to the brake lining support structure including an electrically conducting rod and an electrically insulating sleeve attached to such rod and separating such rod from the brake lining support structure. The inner end of the rod extending a selected distance into the underside of the brake lining. Also the brake lining condition indicator system includes a display means electrically connected to such rod and a power supply adapted to activate such display means when the brake surface contacts the rod after sufficient wearing down of the brake lining.

In order to facilitate understanding of the present invention, reference will now be made to appended drawings of a preferred specific embodiment of the present invention. Similar to the summary of present invention, such drawings should not be construed as limiting the present invention which is properly set forth in the appended claims.

DESCRIPTION OF THE PREFERRED EMBODIMENT OF THE PRESENT INVENTION

Figure 1:
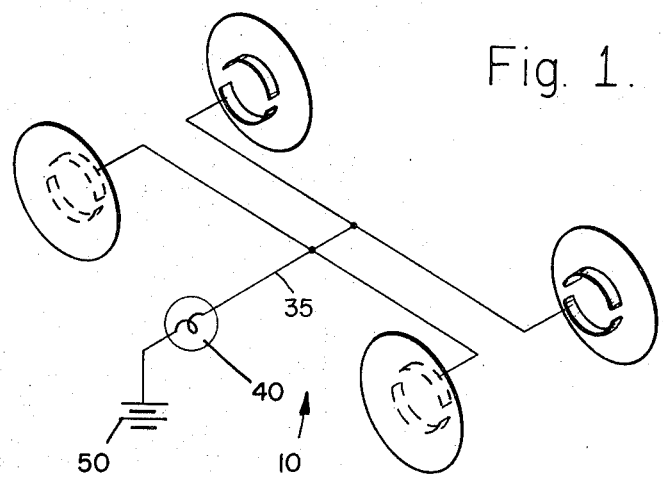
FIG. 1 is a schematic diagram of the brake lining condition indicator system of the present invention as applied to a typical vehicle brake system.
Figure 2:
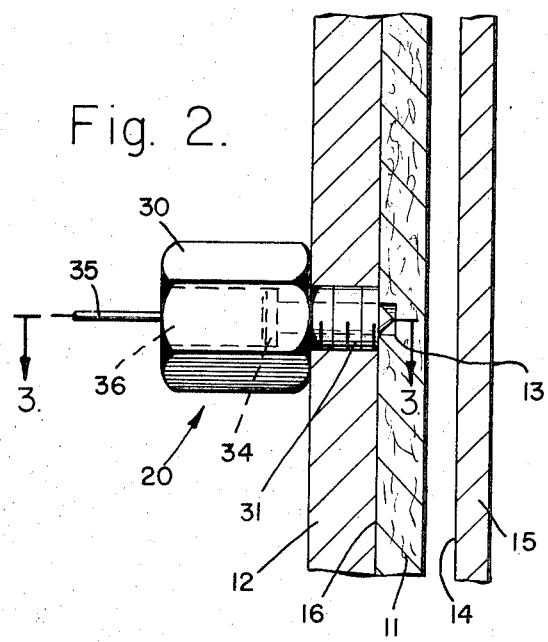
FIG. 2 is a cross-sectional view of a portion of the present invention illustrating the contact means installed on the brake lining support structure.
Figure 3:
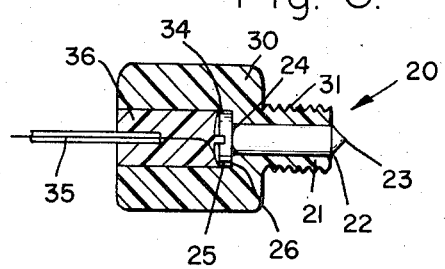
FIG. 3 is a cross-sectional view of a portion of FIG. 2 taken long the lines of 3—3 of FIG. 2.

As illustrated in FIGS. 1–3 of the brake lining condition indicator system 10 is adapted to sense directly the wear of a brake lining 11 mounted on a support structure 12 such as a brake shoe below a selected thickness indicated by the depth of the pocket 13 in the brake lining 11 by an electrically conducting brake surface 14 of a reference structure 15 such as a brake drum. The brake lining condition indicator system 10 comprises an electrical contact means 20 adapted to be attached to the brake lining support structure 12, a display means 40 and a power supply 50. The electrical contact means 20 includes an electrically conducting rod 21 and an electrically insulating sleeve 20 attached to the rod 21 and separating the rod 21 from the brake lining support structure 12. The inner end 22 of the rod 21 extends a selected distance into the underside 16 of the brake lining 11 and has a tapered tip 23 adapted to improve electrical contact with the braking surface 14 and to accurately determine the selected thickness of the brake lining. The outer end 24 of the rod 21 has a head 25 adapted to set the distance the rod 21 extends into the underside 16 of the brakelining 11. Thus the location of the shoulder 26 of the rod head 25 determine the effective length to the tip 23 of the rod 21. Preferably the rod 21 has a uniform external diameter except for the tip 23 and the head 25 and is formed of an electrically conducting material such as copper, aluminum, and brass. In addition to being electrically conducting, such material should be relatively soft so that when the tip 23 of the rod 21 comes in contact with the braking surface 14 it does not mar such surface but simply makes electrical contact therewith.

The sleeve 30 of the contact means 20 has an inner end 31 adapted to receive the rod 21. Thus, as illustrated, the inner end 31 of the sleeve 30 has a substantially uniform internal diameter slightly larger than the diameter of the rod 21 so that the rod 21 is slidably received therein. The outer end 32 of the sleeve 30 has a recess 33 adapted to receive the head 25 of rod 21. Thus the recess 33 forms a seat 34 which receives the shoulder 26 of the rod 21 and thereby cooperates in setting the distance the rod 21 extends into the underside 16 of the brake lining 11.

The sleeve 30 is threaded on its inner end 31 for ease of attachment to the brake lining support structure 12 and wrenching means are formed on its outer end 32 such as a hexagonal exterior cross section to facilitate the attachment of the sleeve to the brake lining support structure 12. The sleeve 30 is made of an electrically insulating material such as ceramic, glass, and plastic.

Attached to the head 25 of the rod 21 and extending out of the recess 33 of the sleeve 30 is an electrical conductor 35 such as a metal wire which is connected through the display means 40 to the power supply 50, such as a grounded car battery. Holding the rod 21 in the sleeve 30 is a plastic plug 36. The display means 40 and the power supply 50 as noted above, is electrically connected to the rod 21 by electrical conductor 35. Display means 40 are preferably simply a light source such as an incandescent bulb which is activated by the passage of electrical current therethrough and which is located in the vehicle so as to be visible to the vehicle operator. The power supply 50 is preferably simply the car battery; however any other conveniently available power supply connected to the vehicle may be utilized. The power supply 50 is adapted to activate the display means 40 when the brake surface 14 contacts the tip 23 of the rod 21 after sufficient wearing down of the brake lining 11.

The operation of the brake lining condition indicator system 10 is adapted to directly sense the wear of the brake lining below a selected thickness. Thus, after the brake lining 11 is worn down so that the braking surface 14, such as the internal surface of a brake drum contacts the tip 23 of the rod 21, an electrical circuit is thereby completed since the brake drum is an effective ground. Once such circuit is completed, current flows from the power source 50 through the display means 40 which activates the display means thereby is a visual indication to the operator of the vehicle that the brake lining needs replacement. Such signal is, of course, repeated each time the vehicle operator uses the brakes so that there is a constant reminder of the need for relining the brakes.

It will be appreciated that many other specific embodiments of the present invention will be obvious to one skilled in the arts in view of the disclosure of the preferred embodiment of the proposed invention. For example, if desired, a separate display means could be utilized for each brake lining or any group of brake linings as well as all of the brake linings so that detailed information about individual brake linings could be obtained. Likewise, various configurations of either the rod or the sleeve or both could be utilized in the contact means to sense the wearing of the brake lining by the conducting portion thereof while insulating such conducting portion from the brake lining support structure to which it is conveniently attached. Also, the inner end of the sleeve may have one standard length which can be varied for specific brake systems by adding a selected number of washers of selected thickness. Of course, if the brake lining support structure were made of insulating material the sleeve could be eliminated since its function would inherently be performed by such structure. Similarly the rod could be reduced in diameter so that it is simply a wire which protrudes into the underside of the brake lining; however, all of such variations are considered to be equivalent to the claimed structure. Moreover the brake lining condition system of the present invention is of course not limited to vehicles such as automobiles, trucks and buses but also can be used in disc brake systems as well as any equipment which uses comparable brake systems.

There are many features in the present invention which clearly show a significant advance which the present invention achieves over the prior art. Consequently, only a few of the more outstanding features will be pointed out to illustrate the unexpected and unusual results obtained by the present invention. One feature of the present invention is that the brake lining condition indicator system senses directly the wear of the brake lining and thus gives an accurate indication of such wear independent of such variables as the driving conditions, and the driving habits of the vehicle operator. Another feature of the present invention is its simplicity and ease of installation since presently existing portions of the vehicle may be utilized such as the battery for the power supply and the braking surface for the electrical ground. Thus the system of the present invention cannot only be easily installed in new vehicles but also in presently used vehicles. Moreover, such simplicity permits the present invention to be both inexpensive and achieve a high degree of reliability which is in marked contrast to the prior art systems. Still another feature of the present invention is the soft fine tip of the contact rod which permits accurate setting of the brake lining thickness and prevents damage to the brake surface.

It will be understood that the foregoing description drawings are only illustrative of the present invention and it is not intended that the invention be limited thereto. All substitutions, alterations and modifications of the present inventions which come within the scope of the following claims or to which the present invention is readily susceptible without departing from the spirit and scope of this disclosure are considered part of the present invention.

We claim:

1. An inexpensive, easily installed brake lining condition indicator system adapted to sense directly the wear of the brake lining below a selected thickness by an electrically conducting brake surface comprising (a) contact means adapted to be attached to the brake lining support structure including an electrically conducting rod and an electrically insulating sleeve attached to said rod and separating said rod from the brake lining support structure, the inner end of said rod extending a selected distance into the underside of the brake lining and the inner end of said sleeve is adapted to receive said rod and the outer end of said sleeve has a recess adapted to receive said rod head and set the distance said rod extends into the underside of the brake lining,
(b) display means directly connected to said rod, and
(c) a power supply adapted to activate said display means when the brake surface contacts said rod after sufficient wearing down of the brake lining.

* * * * *